United States Patent [19]

Ishida et al.

[11] 3,773,190
[45] Nov. 20, 1973

[54] APPARATUS FOR INSPECTING AND HANDLING YARN PACKAGES

[75] Inventors: Kinyu Ishida; Eiji Minaka, both of Matsuyama, Japan

[73] Assignee: Teijin Ltd., Osaka, Japan

[22] Filed: Feb. 4, 1972

[21] Appl. No.: 223,683

[30] Foreign Application Priority Data
Apr. 8, 1971 Japan.............................. 46/21967
Apr. 10, 1971 Japan.............................. 46/27139

[52] U.S. Cl. ........... 214/16 B, 214/44 R, 214/52 R, 198/33 R
[51] Int. Cl. ........................................... B65g 25/00
[58] Field of Search ................. 198/33 R; 214/52 R, 214/16.1 CD, 44 C

[56] References Cited
UNITED STATES PATENTS
3,542,220  11/1970  Propst and Arbor............ 214/52 R
3,244,303  4/1966   Conner............................. 214/309

*Primary Examiner*—Gerald M. Forlenza
*Assistant Examiner*—Kenneth Noland
*Attorney*—Leonard W. Sherman et al.

[57] ABSTRACT

The present invention relates to apparatus for inspecting and handling packages whereby packages such as pirns and bobbins are rotatably placed on pallets for holding packages, and the pallets are conveyed with a roller conveyor such that the packages are caused to rotate automatically for visual inspection; the packages thus automatically inspected are extracted from the pallets and fed into a packing machine and at the same time, emptied pallets are recovered with a recovery conveyor line; and cyclic loading and discharging of packages are repeated.

4 Claims, 18 Drawing Figures

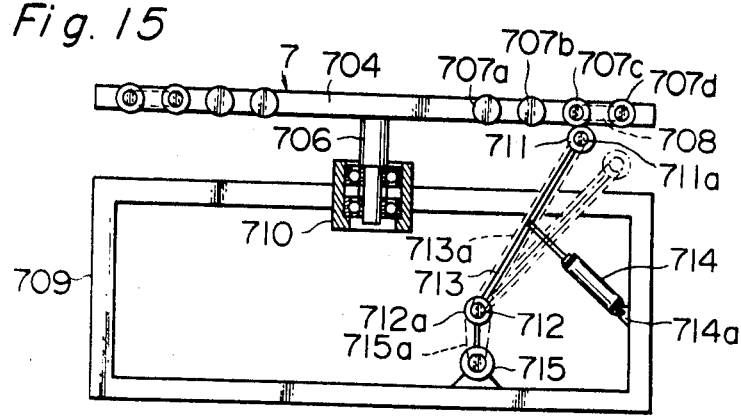
Fig. 15
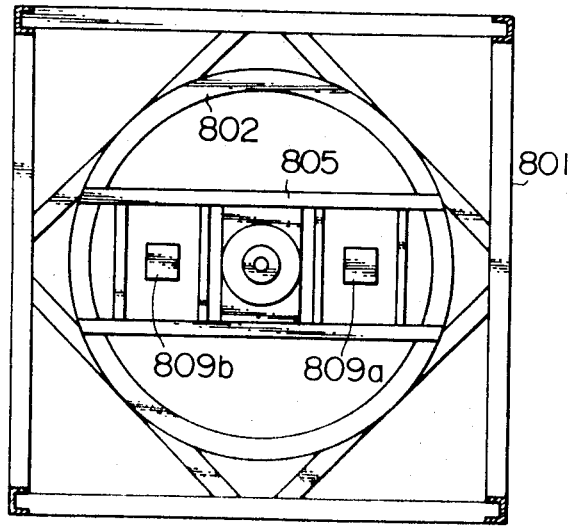
Fig. 16
| CARRYING-IN OF PALLET (α) | — | — |
| --- | --- | --- |
| CARRYING-OUT OF PALLET (δ) | — | — |
| REMOVAL OF PACKAGE (β) | — | — |
| ¼ TURN OF TURN TABLE 7 | — | — |
Fig. 17

APPARATUS FOR INSPECTING AND HANDLING YARN PACKAGES

The present invention relates to apparatus for inspecting and conveying packages of synthetic yarn.

Packages of synthetic yarn, particularly packages wound with a draw twister, are taken out from the draw twister, loaded on trucks and conveyed to the packing sections for inspection and packing. The packages placed on the trucks are picked up one by one with the fingers, inspected visually, put into plastic bags, stored in a carton partitioned for each package and packed.

As described above, when the rate of production is slow and amounts of packages produced are not great, it is possible to inspect and pack them manually. However, owing to the recent changes in production, the amount of yarn wound on a package has increased, and the rate of production, or the number of packages produced, has also increased. When great amounts of considerably heavy packages are to be handled, it has become next to impossible to handle them manually.

With this in mind, the present invention is directed to apparatus for inspecting and handling packages as mechanically and automatically as possible instead of manual package handling.

The apparatus of the present invention comprises means of lifting packages from a package truck, pallets containing the packages and running on a conveyor, means for rotating packages on the pallets conveyed with a conveyor, means for extracting packages from the pallets and feeding them to a packing machine, means for returning emptied pallets and a conveyor assembly for cyclically conveying the pallets.

The effect of the present invention is that packages are handled as mechanically as possible to save manual work, eg., to visually inspect packages while they are being rotated during transportation.

The object of the present invention is to handle, inspect, transport and pack packages without the use of much labor. Particularly it is to lift packages mechanically from a package truck, move them automatically, inspect them in transit without touching them with the fingers, supply them to a packing machine mechanically and thereby conduct series of these operations continuously and cyclically.

FIG. 15 is a partly cutaway side view of the turn table.

FIG. 16 is a diagram showing the operations.

FIG. 17 is a plan view a package-transferring device.

Figure 1:
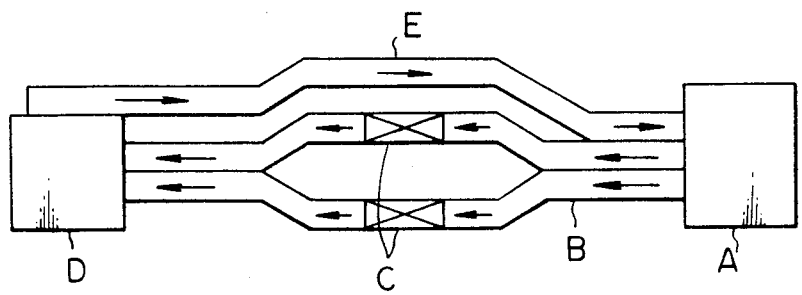
FIG. 1 is a flow sheet of the operation of the apparatus of the present invention.

In FIG. 1, symbol A is a package-despatching section. In this section, numerous packages carried in a package truck are received with package lifts. A group consisting of several packages is loaded to a package pallet on a conveyor B, and pallets loaded with packages run in the direction of arrows in one or more rows. When in a plurality of rows, it is desirable for the rows to ramify themselves in transit. The section C constituting a portion of the conveyor is caused to work as a visual inspection section where packages are mechanically rotated for visual inspection. For convenience of inspection, the rows of pallets are branched here. The pallets which have passed through the section C reach the package-transferring section D, which consists of a turn-table and a package supply device. Packages are extracted from the pallets with the package extractor and led into a carton. The emptied pallets are returned to the package-despatching section A. In this way, numerous packages are continuously carried, with conveyors from the despatching section A to the transfering section D and on the way packages are given visual inspection at C. The pallet, which is a portable platform for movements of packages, takes the opposite direction after it has delivered packages at D and is caused to return to the package-despatching section A.

With reference to the flow sheet, the package-despatching section A, the package visual inspection section C and the package-transfering section D will be described in more detail below.

Figure 3:
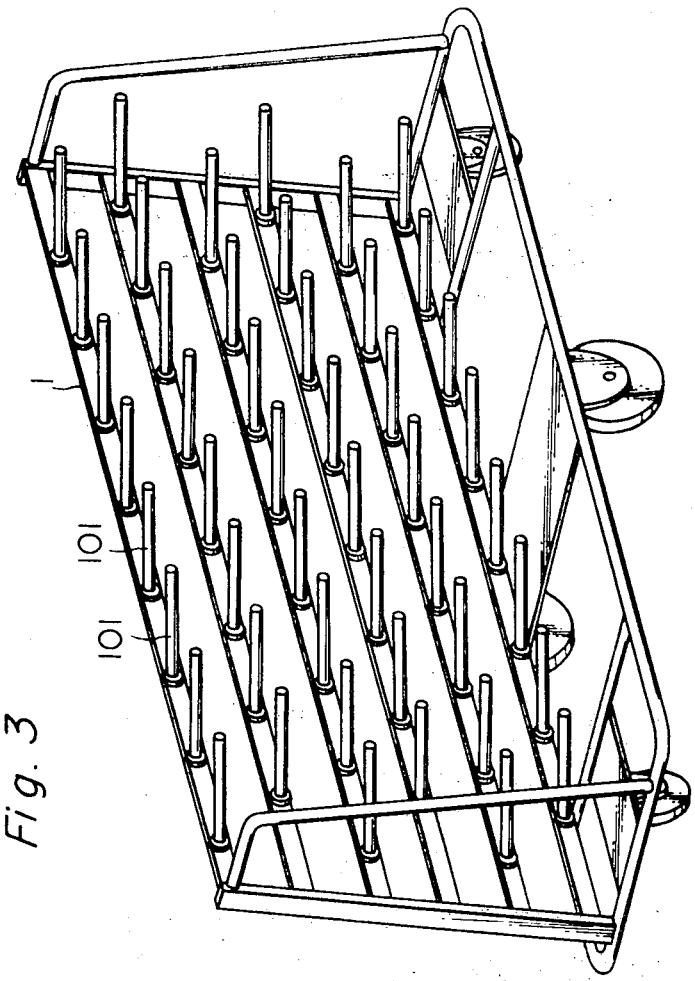
FIG. 3 is a perspective view of a package truck.
Figure 4:
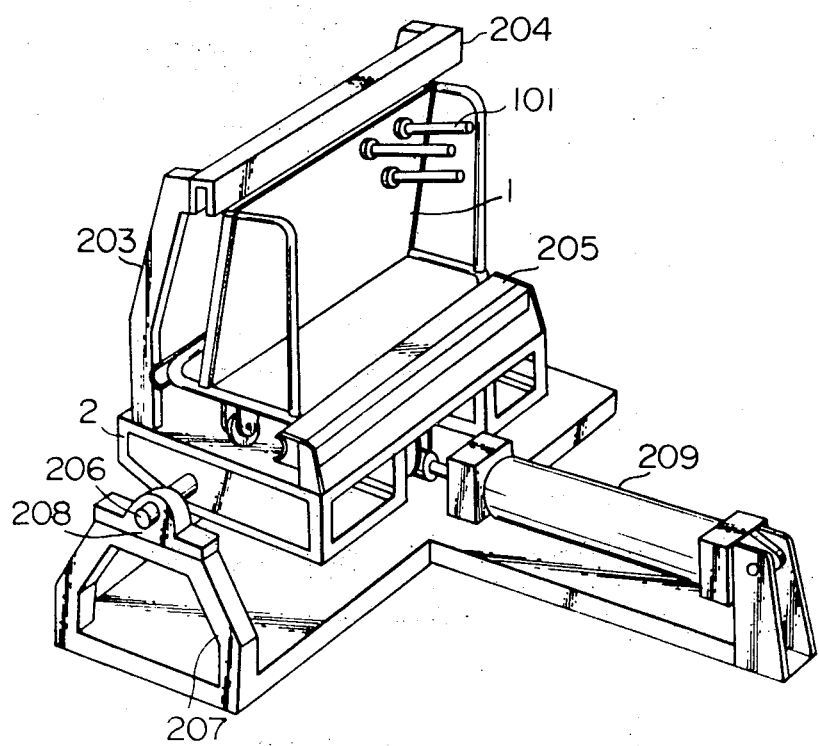
FIG. 4 is a perspective view of a tilting device for a package truck.
Figure 5:
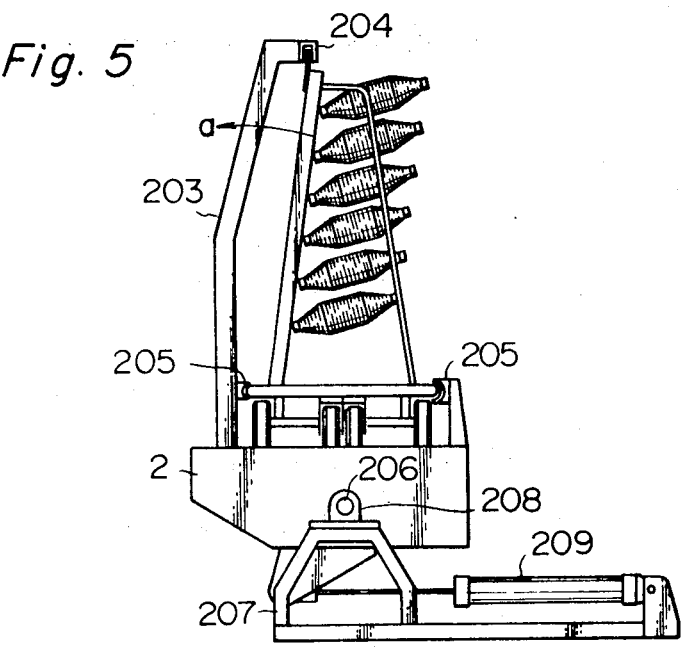
FIG. 5 is a side view of the tilting device for the package truck.
Figure 6:
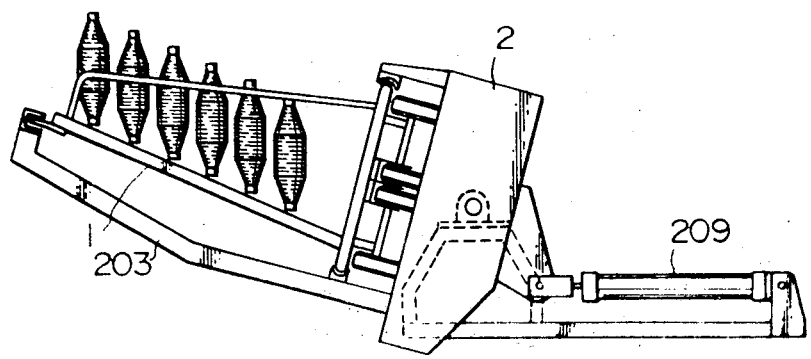
FIG. 6 is a side view showing the state in which the tilting device for the package truck is actuated.
Figure 7:
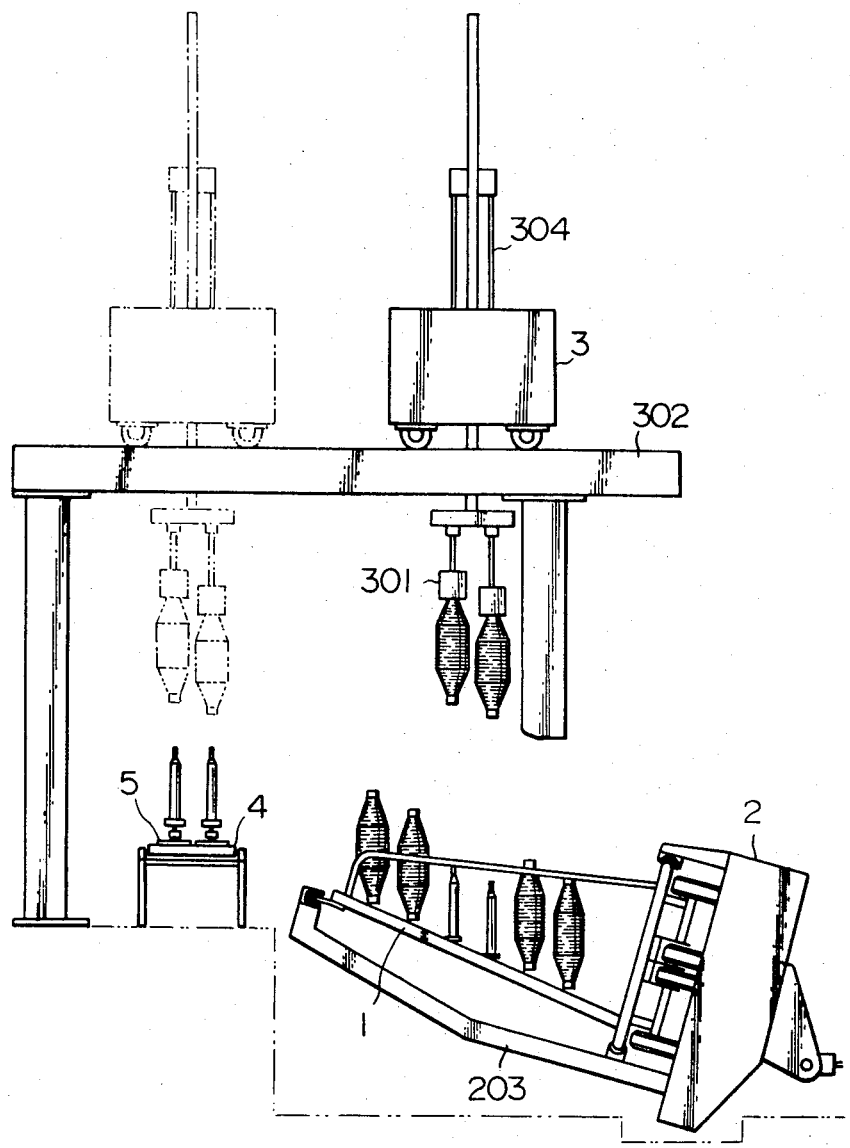
FIG. 7 is a side view showing a package-extractor.

Numerous packages, as shown in FIG. 3, are loaded in a truck 1. The base frame of the truck is provided with four wheels. Pegs 101 are juxtaposed on numerous supports laid between the two square poles perpendicular to the base frame and packages are inserted on the pegs. The pegs 101 slightly slope upwardly to keep packages from falling down in transit. For the ease of handling packages in the package-despatching section, it is desirable to cause them to stand erect and change the state of packages in FIG. 5 into that of FIG. 6 with the use of means 2 for tilting a truck. The means 2 for tilting a truck in FIGS. 4, 5 and 6 comprises guides 204 and 205 for positioning a truck at the times of its entry and tilting and a frame 203 to support the guides. The frame 203 is supported with a shaft 206, which acts as a fulcrum at the time of reversal and which is supported with a bearing 208 mounted on a stationary foundation frame 207. A hydraulic cylinder 209 is employed in tilting the frame 203, and the tip of a piston rod of the hydraulic cylinder is connected to a lower protuberance of the tilting means 2. It is essential, as shown in FIG. 7, in installing the tilting means to arrange packages at the time of reversal in such a way that they correspond to the operation of the package lift in the package-despatching section A. In FIG. 5, the truck 1 loaded with packages is carried in the tilting means positioned in place. With the use of hydraulic cylinder 209, it is tilted in the direction of an arrow $a$ such that it is finally positioned as shown in FIG. 6.

As shown in FIG. 7, packages are lifted with package chucks 301 of a package lift 3 (as hereinafter discussed) and placed on a pallet 5 on a conveyor 4. The emptied truck 1 is recovered to the original state as in FIG. 4 with the tilting operation of the hydraulic cylinder 209 of the tilting means.

Any suitable mechanism of tiling a package truck can be utilized. For instance, an air cylinder or a linear motor such as a combination of a rack and a pinion gear may be used to rotate the shaft 206.

Figure 2:
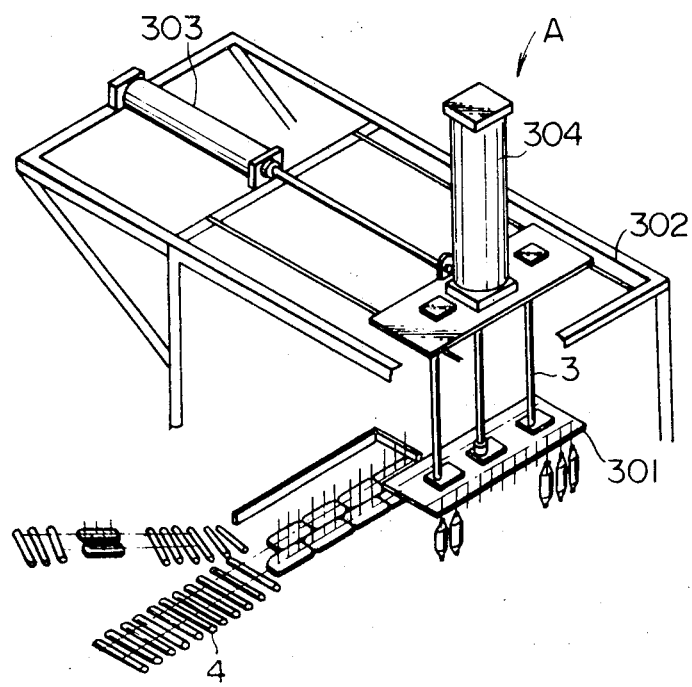
FIG. 2 is a prespective view of a package despatching section A.

In FIG. 2, the package lift 3 is slidably supported on a frame 302 and positioned above the conveyor 4. It caused to be provided with reciprocating motion from the conveyor 4 to the tilting means 2 for the truck by air cylinder 303. The package chuck 301 hangs down below the package lift to be movable up and down with an air cylinder 304 and is adapted to be capable of opening or closing with compressed air.

Figure 8:
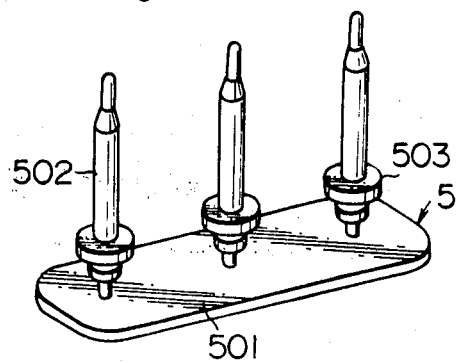
FIG. 8 is a perspective view of a package pallet.

As shown in FIG. 7, a set of the chucks 301 is hung down to catch packages in the truck with the help of compressed air. The set of the chucks 301 which has caught packages is lifted to a certain height with the air cylinder 304, and the package lift 3 is horizontally moved to the conveyor 4 where a plurality of pallets 5 are arranged by the air cylinder 303. The pallet 5, as shown in FIG. 8, consists of two or more freely rotatable flanged spindles 502 erect on a flat base plate 501. The package chuck is lowered to allow the spindle 502 to be inserted into a package by causing the center line of the package to correspond to that of the spindle 502. A plurality of pallets are thus loaded with numerous packages by repeating the above-described operation. After the completion of the operation, the chucks 301 are lifted to given height and the package lift 3 is returned to its original position by the air cylinder 303, that is, above the tilted truck.

Figure 10:
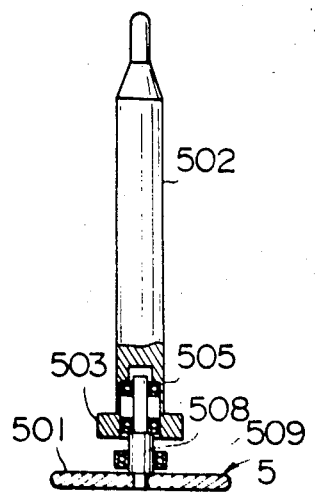
FIG. 10 is a partly cutaway side view of a package pallet.
Figure 9:
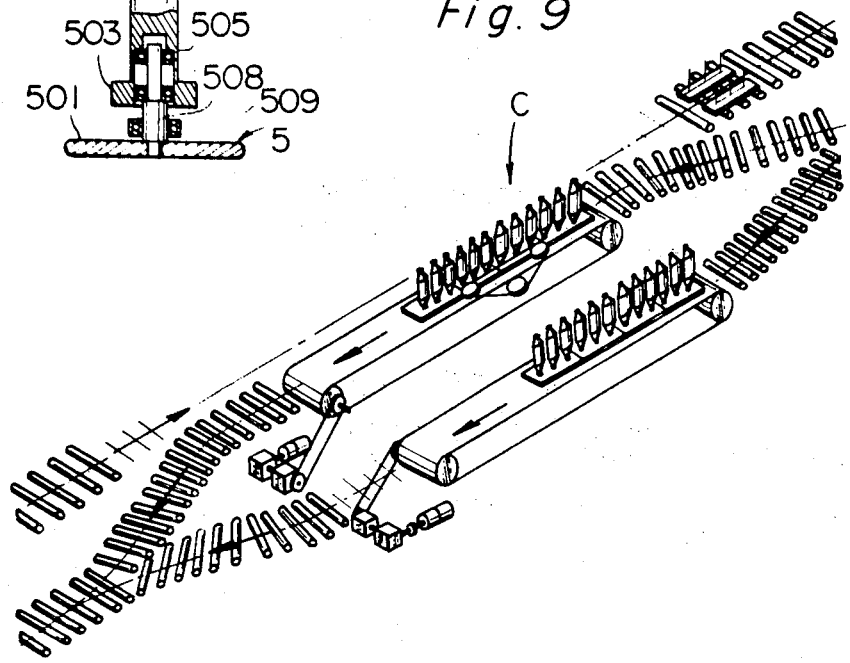
FIG. 9 is a perspective view of a visual inspection section C.

The pallets loaded with packages are transferred to the visual inspection section C with the conveyor 4, which is composed of numerous rotary rollers juxtaposed to each other. The spindles 502 or other suitable means can be used to hold packages and the distance between the spindles 502 should be greater than the size of full package. In mounting the spindle 502 rotatably on the base plate 501 as shown in FIG. 10, a bearing 505 is supported with a stepped shaft 508 fitted in the base plate 501 and the lower part of the spindle 502 is secured around the bearing 505. A ball bearing 509 arranged at the lower part of the shaft 508 acts as a guide roller for advancing the pallets along guide rails (not shown) disposed on the conveyor when the pallets are carried on the cycling conveyor.

While the specific construction of a spindle as illustrated in FIG. 10 is preferred, and suitable spindle construction can be utilized.

Figure 11:
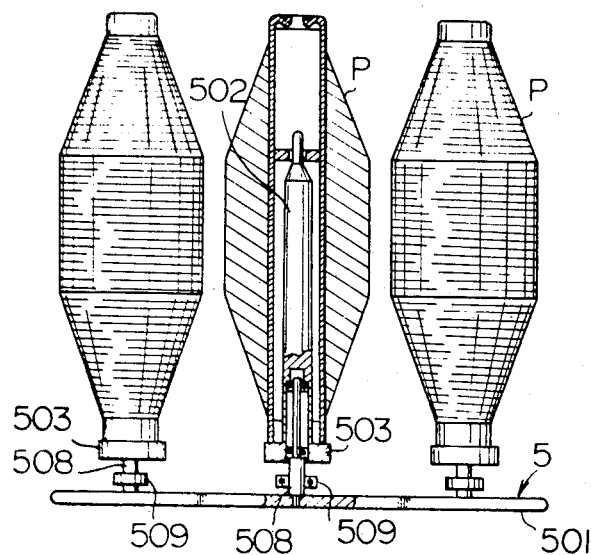
FIG. 11 is a side view showing package pallets loaded with packages.

FIG. 11 shows the state in which packages P have been placed on the spindle 502.

The use of such a pallet enables the free rotation of packages by the fingers or by driving the outer periphery of the flange 503 with belting to inspect the appearance of packages.

And with the use of base plate 501 of the pallet wider than the size of a full package, the packages are free from damage or stain in transit no matter what contact the pallets have with each other. Packages may freely be detained in a given position of the conveyor, branched or joined in transit and can be treated rough like general solid articles.

Further in lifting packages it is possible to carry out the operation by collecting several packages into a group according to the number of spindles 502 and positioning of packages becomes easy with the use of the base plate 501. With the use of such a pallet, there is no need to hold up each package with the fingers for inspection, and automatic transport, inspection and packing of packages becomes practicable.

Figure 12:
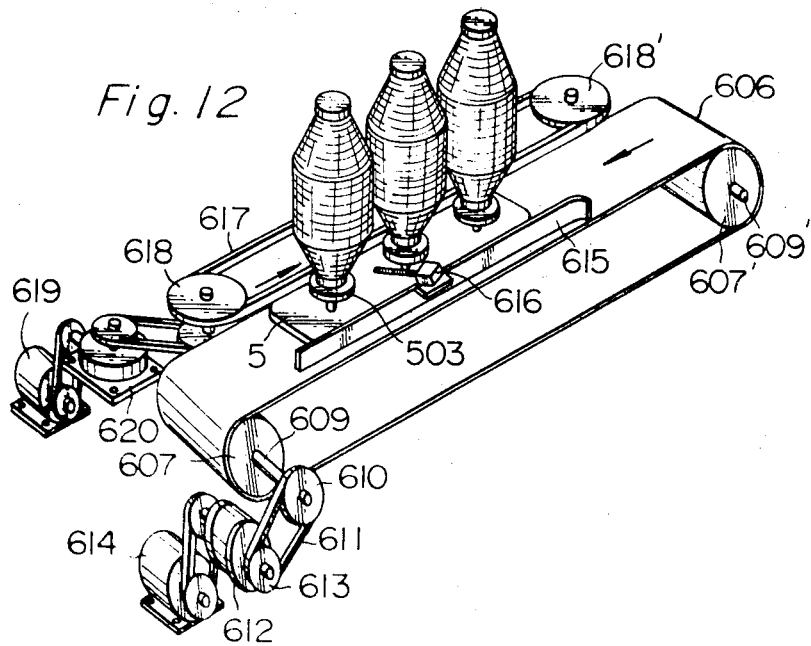
FIG. 12 is a detailed perspective view of the visual inspection section C.

FIG. 12 is a perspective view of means for facilitating visual inspection of packages during the transportation with the use of the pallet. The means comprises a conveyor carrying a pallet provided with freely rotatable spindles and means for driving by friction and rotating the spindles.

The conveyor carrying pallets in the visual inspection section may be the conveyor 4 itself or an auxiliary conveyor between the main conveyors capable of being driven independently of the main conveyor 4 to ease the operation.

FIG. 12 shows an auxiliary conveyor 606. Numerals 607 and 607' are pulleys for driving the auxiliary conveyor 606. Shafts 609, 609' supporting the pulleys 607, 607' are rotatably held by means of a bearing (not shown). A pulley 610 mounted on one end of the shaft 609 is connected to a pulley 613 of output shaft on an a clutch 612 by means of a belt 611. The clutch 612 is connected to the output shaft of a motor 614 by means of a belt and driven by the motor 614. A guide rail 615 for the pallet 5 is secured to a frame separate from the auxiliary conveyor 606 to regulate the running position of the pallet 5. A limit switch 616 is attached to the guide rail 615 and engages the shaft 508 to the pallet 5 of generate an on and off signal for the clutch 612. A belt 617 drives by friction the spindles 502 and is rotated by pulleys 618 and 618' to be engaged with the peripheral surface of the flanges 503 of the spindles. The pulley 618 is rotated by a motor 619 such that belt 617 is moved in the direction of the arrow.

The pallet on the main conveyor 4 is supplied to the auxiliary conveyor 606, which is caused to run in the direction of the arrow by the shaft 609 and the pulley 607 driven by the motor 614 through the clutch 612. The belt 617 is driven with a motor 619 via a reduction gear 620. The pallet 5 is controlled with the guide rail 615 to be kept from lateral displacement and carried by the auxiliary conveyor 606. When the pallet 5 reaches the belt 617, the flange 503 of the spindle 502 on the pallet is pressed against the belt 617 such that the spindle continuously rotates on its own axis together with the package. If the pallet moved with the auxiliary conveyor 606 is engaged with the limit switch 616 in front of an operator by the help of the shaft 508, a signal to release the clutch 612 is generated to stop the auxiliary conveyor 606. Packages rotate on their axis in front of the operator to allow him to check the appearances of the packages carefully and slowly from top to base of the packages. When the time required for inspection set with a timer (expires not shown), that is, when the time period of stoppage of the conveyor 606 has elasped, the clutch 612 again turns on by the signal of the timer to cause the conveyor 606 to transfer the pallet 5 to the next processing. When irregular packages are found at the time of inspection, they are rejected on the spot, or later during the subsequent transfer of the pallet after marked.

With the use of such an apparatus, package inspection can be conducted during the automatic transfer of packages by the conveyor 4 in one of series of flow process.

In one embodiment of FIG. 12, a friction belt was used to rotate a spindle, but a friction disc may be arranged opposite the spindle to rotate it and the auxiliary belt conveyor 606 was intermittently stopped, but during the continuous running of the belt, inspection may be carried out. Further the start-up and stoppage of the auxiliary belt 606 was automatically controlled with a limit switch and a timer, but it may manually be handled.

Figure 13:
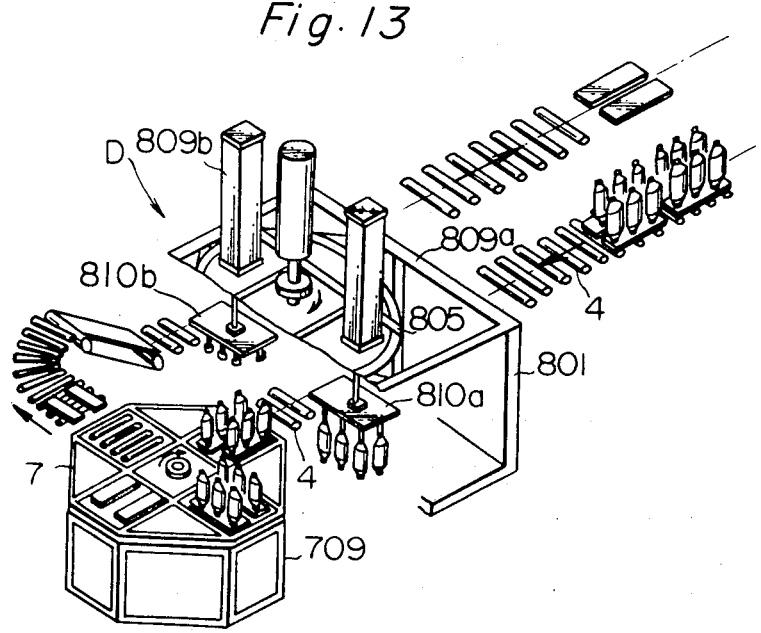
FIG. 13 is a perspective view showing a package transferring section D.

In FIG. 13, pallets carried by the conveyor 4 are transferred to a turn-table 7. Packages are lifted with a chuck hanging from a rotary platform 805, transferred to the next area and dropped into cartons. The emptied pallet is moved to a homeward conveyor E with the rotation of the turntable.

Figure 14:
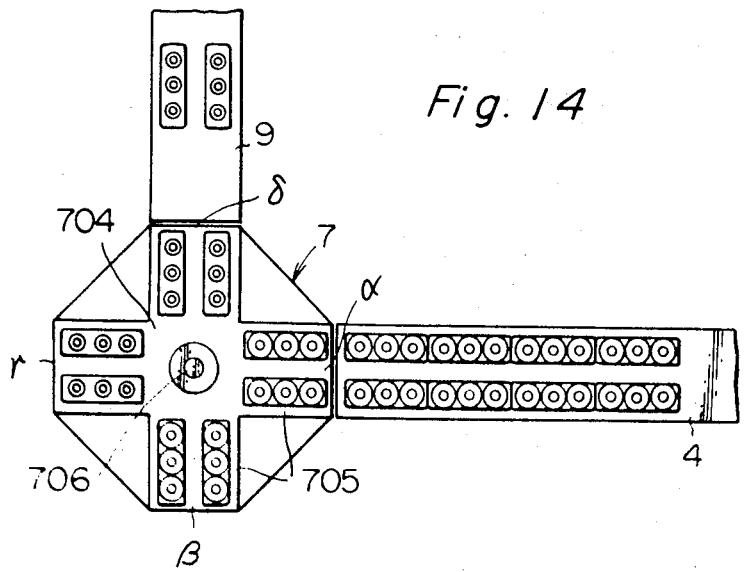
FIG. 14 is a plan view of a turn-table.

In FIGS. 14 and 15, numeral 4 is a conveyor for carrying pallets, numeral 7 a turn table, and numeral 9 a conveyor for recovering emptied pallets. The conveyors 4 and 9 intersect each other at right angles such that they are arranged toward the center of the turntable 7 and their tips are engaged with the periphery of the turntable 7.

The turntable 7 comprises a rotary base 704 and four identical members formed radially from the center of the rotary base and used storage members of articles. In the embodiment, the four storage members 705 are arranged such that they intersect each other at right angles and a rotary shaft 706 is secured to the center of the rotary base 704. In FIG. 15, the storage members 705 consist of four freely rotatable conveyor rollers 707 a, 707 b, 707 c and 707 d arranged in a groove formed on the rotary base 704. The outside rollers 707 c and 707 d are held with a belt 708 to rotate synchronously. Numeral 709 is a platform supporting the turntable 7 and numeral 710 is a bearing secured to the center of the platform 709 to keep the rotary shaft 706 freely rotatable. Numeral 711 is a friction drive roller, which is rotatably mounted on an arm 713 rotating around a rocker fulcrum shaft 712. An air cylinder 714 is mounted on the platform 709 via a pin joint 714 to oscillate the arm 713. A driving motor 715 is secured to the platform 709 to rotate the friction drive roller 711. The rotation of the driving motor 715 is transmitted to a sprocket 712 a of the rocker fulcrum shaft 712 by means of a chain 715 a and then to a sprocket 711 a secured to tip of the arm 713 coaxially with the friction drive roller 711 by means of a chain 713a to rotate the frication drive roller 711. Another friction drive roller is installed in the position δ (later discussed) facing the conveyor 9. It follows that friction drive rollers are arranged in the two positions, α and δ (See FIG. 14).

The pallet holding packages erect is fed into the turntable 704 with the conveyor 4. It is assumed that the turntable is empty and the position of the storage 705 facing the conveyor 4 is called α and the other positions are clockwise called βγ and δ which falls on the conveyor 9.

When the turntable 7 stops such that one of the storage members 705 in the position α faces the conveyor 4, two pallets are pushed into the storage member 705 from the conveyor 4 and subsequently the conveyor 4 stops. At this time, the air cylinder 714 pushes upward the arm 713 to urge the friction drive roller 711 always rotating at the tip of the arm 713 against the conveyor roller 707 c and to rotate the conveyor roller 707 c. In FIG. 15, the friction drive roller 711 rotates clockwise and the conveyor rollers 707 c and 707d anticlockwise to pull the pallets into the storage member 705. When two pallets are stored in the storage member 705 in the position αthe air cylinder 714 retreats to disengage the friction drive roller 711 from the conveyor roller 707 c during which time the turnatable 7 rotates one quarter of a circle and stops (The turntable 7 is rotated by rotary shaft 706). The drive source (not shown) may optionally include conventional electric or hydraulic motors. Any source capable of intermittently rotating the turntable one-fourth of a circle will suffice. Hence the other emptied storage member 705 faces the position α and the pallets loaded with packages come to the position β. In the position αlikewise, subsequent pallets are pushed into the storage member, and in the position six packages on the pallets are extracted (Packages are mechanically extracted and packed in a carton.). Hence a package extractor is positioned in the position β (later discussed).

The turntable 7 is again rotated a quarter of a circle and stops. Likewise pallets are pushed into the storage in the position α and packages are extracted in the position β. At that time, emptied pallets reach the position γ where no operations are carried out.

Successively the turntable 7 rotates a quarter of a circle and stops. The state of pallets at this time is illustrated in FIG. 14. In the position α. pallets are pushed into the storage, packages are extracted from pallets in the position βemptied pallets are stored in the position γ and in the position δ, the first emptied pallets are seen. In the position δ is disposed a friction drive roller 711 as in the position α to act in the same way but rotate in the opposite direction. The conveyor roller 707 c is driven with the friction drive roller 711 to push pallets into the conveyor 9. The pallets thus pushed are collected and returned to the starting point of the conveyor 4 by the conveyor 9 for use in the subsequent transfer of pallets. The working conditions of the turntable 7 are charted in FIG. 16, where time elaspses in the right direction.

In this way the turntable 7 intermittently rotates one quarter of a circle to allow the friction drive roller 711 to repeat engagement and disengagement, package-extracting device in the position β works in response to the rotation of the turntable 7. These devices can be operated according to the desired programs by electrically and mechanically controlling the drive source therefor. That is, they can be operated according to the programs as shown in FIG. 16 and series of operations such as carrying of pallets, extraction of packages, and return of emptied pallets are automatically operable.

In this conveyor system, radial storage members are provided on the turntable and they are in turn used by the rotation of the turntable and as shown in FIG. 16, the feed, discharge and treatment of articles can be carried out side by side. The conveyor system is, thus, compact, and the layout of the apparatus is quite simple and trouble-free.

Further, the storages are formed with freely rotatable conveyor rollers and are caused to optionally rotate by means of friction drive rollers mounted outside the turntable. Accordingly the conveyor rollers are optionally rotatable to provide satisfactory operations and control of the section. The storing and discharging of articles are carried out by driving the conveyor rollers and there is no direct damage on the articles. The system is quite useful for packages which should be kept from direct contact with conveyor and transfer apparatus for the prevention of soil and stain.

Figure 18:
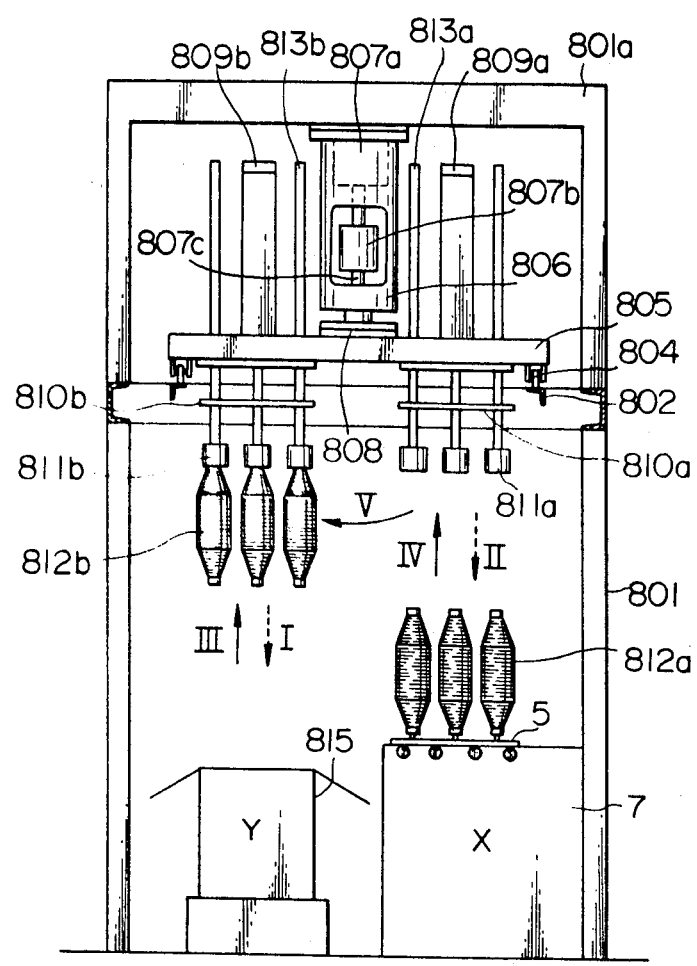
FIG. 18 is a side view of a package-transferring device.

In FIGS. 17 and 18, one embodiment of extraction of packages from pallets and packing thereof in a carton is illustrated. A circular rail 802 is arranged in the upper surface of a square frame 801 and a rotary platform 805 is supported on wheels 804 in register with the circular rail 802. A housing 806 for accommodating driving members suspended from the center of the upper portion 801a of the frame 801 is disposed above the rotary platform 805. An air motor 807a rotatable through 180 deg for driving is embedded in the upper portion of the housing 806. The output shaft of the air motor 807 a is linked with an intermediate shaft 807 c by a coupling 807b. The intermediate shaft 807 c is supported by a bearing (not shown) located in the lower part of the housing 806, and it is linked with the rotary platform 805 by means of a flange 808. Thus the rotary platform 805 is rotated by the air 807 a.

Two air cylinders 809 a, 809 b are perpendicularly arranged above the rotary platform 805 symmetrically with respect to the center of the rotary platform 805. The rods of the air cylinders 809a, 809 b run through the rotary platform 805 and protrude downward. To the tips of the rods are secured plates 810 a, 810 b of the package chucks which are capable of being raised or lowered with air cylinders 809 a, 809 b, respectively. Guide bars 813 a, 813 b are secured to the fixing plates 810 a, 810 b and run through the rotary platform 805 to prevent the deflection of the plates 810 a, 810 b. A plurality of chucks 811 a, 811 b are attached to the plates 810 a, 810 b.

The chucks may be any type capable of arresting or releasing packages by means of compressed air or electricity, well known in the art.

The driving means may be an electric motor instead of an air motor.

From the state as in FIG. 17, the rods of air cylinders 809 a, 809 b are pushed out at the same time, and descend in order that the chucks 811a on the side X may grip packages 812 a and the chucks 811b on the side Y may release packages 812b. The actions I, II marked by arrows are taken at the same time. When the chucks 811a on the side X grips the package 812a at the lowest points, and the chuck 811b on the side Y loses its grip of the package 812b after its entry in a carton 815, the air cylinders 809a, 809b withdraw their rods to raise the chucks 811a, 811b. That is, the actions III, IV marked by arrows are taken at the same time. Then the air motor 807a is actuated to rotate the rotary platform 805 through 180 deg (arrow V) and stops. The last state is entirely the same as the first one. Afterwards the actions of I, II → III, IV → V are cyclically repeated.

The action V is a reciprocating action, repeating regular and reverse rotations through 180 deg. Thus the pipes of compressed air for the air motor 807a are kept from being twisted.

The above-described actions are automatically taken with a limit switch and a compressed air change-over valve (not shown).

The rotary platform 805 can, of course, rotate in the same direction, if it is arranged so as to stop at every 180 deg, but it is more advantageous in the installation of a compressed air hose and so on that it rotates in reciprocating action at every 180 deg.

In the above-described example the center shaft of the rotary platform was driven with an air motor, but it may be driven by setting circular stationary teeth (inner-tooth gear) concentric with the circular rail and securing a pinion in register with the stationary teeth on the rotary platform or by suspending the rotary platform instead of supporting the rotary platform with the circular rail.

The present apparatus can increase operating capacity widely because it can take a plurality of actions such as conveying, clamping and releasing actions in conveying articles at the same time by suspending extractors for extracting articles at the tips of rods of a plurality of air cylinders symmetrically secured to the rotary platform with respect to its center and allowing each extractor to handle articles individually.

Further the conveying device of the present invention is not limitative to such a rotary platform but it may be a type such as the package arrestors as described in the package-despatching section, which can make a reciprocating motion. The terms "conveying system" or "package extractors" are utilized to describe means of holding and conveying packages though expressions differ.

While a specific description of each device of the apparatus of the present invention is set forth above, in practice, the apparatus of the present invention requires each device to be automatically interrelated to each other for operation by electrically controlling the drive sources, such as motors and air cylinders. The construction of such an electrical control circuit is merely a matter of a choice of design.

We claim:

1. Apparatus for automatically despatching, inspecting and transferring packages of yarn comprising a package-despatching section, a package-visual inspection section, a package-transferring section and conveyor means connecting said package-despatching, package-visual inspection and package-transferring sections in combination and including a package truck and a plurality of pallets, said package-despatching section having means for tilting said package truck, package lifts for lifting packages from said tilted package truck and loading said pallets on said conveyor means with the lifted packages and means for automatically operating said package lifts; said package-visual inspection section being arranged along said conveyor between said package-despatching section and said package-transferring section and having means for moving said pallets and means for rotating packages of yarn on said pallets; said package-transferring section having means for receiving said pallets carried into said package-transferring section and discharging the emptied pallets, means for extracting packages from said pallets and transferring the packages to a carton and means for automatically operating said package receiving and discharging means and said package-transferring means.

2. The apparatus for automatically despatching, inspecting and transferring packages as set forth in claim 1 wherein said means for tilting said package truck comprises a frame loaded with said package truck and positioning said package truck in place, a shaft arranged below said frame and acting as a fulcrum during tilting of said frame and a fluid cylinder connected to said frame whereby said frame is tilted by a reciprocating motion of said fluid cylinder.

3. The apparatus for automatically despatching, inspecting and transferring packages as set forth in claim 1 wherein said pallets loaded with packages each includes a long base plate, and a plurality of spindles having flanges extending therefrom, said spindles being mounted freely rotatably on said base plate whereby said spindles and the packages of yarn on said spindles are caused to rotate by friction drive on the outer periphery of said flanges.

4. The apparatus for automatically despatching, inspecting and transferring packages as set forth in claim 1 wherein said package-transferring section includes a turntable, a plurality of pallet storage members extending radially from the center of said turntable, a rotary shaft secured to the center of said turntable, and friction drive roller means disposed below said storage members, said pallet storage members each having freely rotatable rollers whereby when said storage members are positioned in place to contact said friction drive roller means said pallets on said rollers are moved in a predetermined direction by rotation of said friction drive roller means.

* * * * *